United States Patent [19]

Johnson et al.

[11] Patent Number: 4,537,928

[45] Date of Patent: Aug. 27, 1985

[54] RUBBER COMPOSITIONS CONTAINING ALUMINUM PHOSPHATE

[75] Inventors: Marvin M. Johnson; Max P. McDaniel, both of Bartlesville, Okla.

[73] Assignee: Phillips Petroleum Company, Bartlesville, Okla.

[21] Appl. No.: 559,135

[22] Filed: Dec. 7, 1983

[51] Int. Cl.$^3$ .......................... C08K 3/32; C08K 3/10
[52] U.S. Cl. ..................... 524/417; 524/575
[58] Field of Search ................ 524/417, 575

[56] References Cited

U.S. PATENT DOCUMENTS

| | | | |
|---|---|---|---|
| 1,315,342 | 9/1919 | Sharpneck | 106/281 R |
| 2,909,451 | 10/1959 | Lawier et al. | 117/169 |
| 3,330,798 | 7/1967 | Deissmann et al. | 524/417 |
| 3,413,232 | 11/1968 | Quinn | 252/301.1 |
| 3,650,683 | 3/1972 | Hloch et al. | 23/105 |
| 3,950,478 | 4/1976 | Kenworthy et al. | 264/234 |
| 3,960,592 | 6/1976 | Birchall et al. | 106/308 Q |
| 4,005,172 | 1/1977 | Birchall et al. | 423/300 |
| 4,043,966 | 8/1977 | Edwards et al. | 524/417 |
| 4,098,749 | 7/1978 | Hoshino et al. | 524/417 |
| 4,104,225 | 8/1978 | Conbere | 524/546 |
| 4,131,545 | 12/1978 | Redmayne et al. | 210/47 |
| 4,140,834 | 2/1979 | Marcantonio et al. | 524/417 |
| 4,364,854 | 12/1982 | McDaniel et al. | 252/437 |
| 4,364,855 | 12/1982 | McDaniel et al. | 252/437 |

FOREIGN PATENT DOCUMENTS 0043919  4/1979  Japan ................ 524/417

OTHER PUBLICATIONS

Materials, Compounding Ingredients in Machinery for Rubber, Blue Book 1981, Bill Communications, Inc.
Chem. Abs. 97 (1982), 57242 Mitani, JP-82-28156, (Feb. 1982).
Derwent Abst. 84-099854/16, (Jul. 1983 Pub. Date), SU 1028639-A.

*Primary Examiner*—Herbert J. Lilling
*Attorney, Agent, or Firm*—A. W. Umphlett

[57] ABSTRACT

Aluminum phosphate is used as a filler in vulcanizable rubber composition to provide, upon vulcanization, a reinforced rubber composition.

22 Claims, No Drawings

RUBBER COMPOSITIONS CONTAINING ALUMINUM PHOSPHATE

BACKGROUND OF THE INVENTION

This invention relates to filled rubber compositions. In one of the aspects this invention relates to the use of aluminum phosphate as a filler for rubber compositions. In another of its aspects this invention relates to products obtained by curing rubber compositions having aluminum phosphate filler.

Carbon black has historically been the reinforcing agent of choice for rubber-based products such as tires and extruded or molded goods. Carbon black, which is produced by the thermal decomposition of oil and natural gases, greatly enhances mechanical strength and resistance to abrasion and has, in the past, been an economically attractive approach to improving the physical properties of rubber products. Increasing demand for other oil and gas derived petrochemicals, combined with the decreasing supply of oil and natural gas, has prompted the search for a replacement for carbon black as the reinforcing agent for rubber-based products.

The use of silica as a replacement for carbon black has in general brought higher cost and an at least slightly poor performance to reinforced rubber-based products. Other materials have, therefore, been tried as a replacement for carbon black that will at least perform as well as silica as a reinforcing agent for rubber-based products. Among these alternative materials it has been discovered that aluminum phosphate provides physical characteristics to rubber compositions that in some aspects are better than those obtained with silica.

Accordingly an object to this invention is to provide a novel reinforcing promoter for rubber compositions. Another object of this invention is to provide reinforced rubber: compositions exhibiting improved properties as compared to silica filled compositions. A still further object of this invention is to provide vulcanized rubber compositions containing aluminum phosphate.

Further objects, aspects, as well as several advantages of this invention will be apparent to those skilled in the art upon reading the specification and the appended claims.

SUMMARY OF THE INVENTION

Broadly, the present invention is the use of aluminum phosphate as reinforcing filler for rubber products.

More specifically, in accordance with the invention, vulcanizable rubber compositions are provided in which a curable rubber polymer is admixed with an effective reinforcing amount of aluminum phosphate.

The rubber component of this invention can be of any type although it is preferred that the rubber be subject to a sulfur-type vulcanization and as such should have some degree of unsaturation. Typical rubbers useful in this invention include natural rubber, homopolymers or copolymers of conjugated dienes, copolymers of conjugated dienes, and monovinylarenes, which would include emulsion and solution polymerized rubbers, terpolymers of ethylene, propylene, and a non-conjugated diolefin, butyl rubber, and nitrile rubber. The polymers can be linear or branched. The conjugated dienes suitable are those which ordinarily contain 4 to about 12 carbon atoms per molecule with those containing 4 to about 8 carbon atoms being preferred and are exemplified by 1,3-butadiene, isoprene, piperylene, 2,3dimethyl-1, 3-butadiene, 3-butyl-1,3-octadiene, 2-phenyl-1,3-butadiene, and the like, and mixtures thereof. The monovinylarenes suitable are those which ordinarily contain 8 to about 16 carbon atoms per molecule and are exemplified by styrene, alpha-methyl styrene, 3-methyl styrene, 4-n-propyl styrene, 4-p-tolyl styrene, 1-vinyl naphthalene, and the like, and mixtures thereof.

The invention is particularly useful with butadiene/styrene rubbery copolymers, preferably those having a bound styrene content of about 20–30 weight percent. The butadiene/styrene rubbery copolymers can be prepared by emulsion or solution polymerization techniques, presently preferably by emulsion polymerization.

The aluminum phosphate useful in the present invention can be obtained from any source. Presently preferred is aluminum phosphate having a chemical formula of $AlPO_4$ (i.e., the molar Al:P ratio is essentially 1:1), a $BET/N_2$ surface area (ASTM D 3037-78) ranging from about 40 to about 100 $m^2/g$, and a CTAB surface area (ASTM D 3765-80) ranging from about 30 to about 80 $m^2/g$.

The aluminum phosphate is incorporated into the rubber in an effective reinforcing amount which will usually be an amount in a range of about 2 to 60 phr (parts by weight per 100 parts by weight of rubber), preferably from about 5 to about 30 phr.

Appropriate compounding ingredients which are well known in the rubber industry can also be employed in the rubber composition of this invention. These include accelerators, vulcanizing agents such as sulfur and sulfur yielding compounds, antioxidants, antiozonants, light stabilizers, other fillers, processing aids, and the like.

Industrial fields of use for the described rubber mixtures include, for example, industrial rubber articles such as cable insulation, hoses, driving belts, V-belts, conveyor belts, roller coating, vehicle tire treads, tire carcasses, tire sidewalls, cross country tires, shoe sole materials, packing rings, damping elements, and many others.

The rubbery composition formulation used in this invention is considered conventional.

The following examples serve to illustrate the use of selected tackifying resins as reinforcing promoters in silica-filled sulfur vulcanized rubber compositions.

The inventive rubber compositions can be prepared by any suitable mixing means, such as a roll mill, preferably by incremental addition of the ingredients as described in Example I. Vulcanization of the inventive rubber compounds can be accomplished by compression molding, preferably at about 150°–175° C.

The following examples are meant to be illustrative and should not be taken as restrictive.

EXAMPLE I

In this example the preparation of aluminum phosphate, $AlPO_4$, to be used as a filler in rubber is described. 187.7 grams of $Al(NO_3)_3 \times 9H_2O$ and 80.5 grams of $NH_4H_2PO_4$ were dissolved by heating in 2 liters of water. Gelatinous $AlPO_4$ was precipitated from this solution by addition of about 100 ml of dilute, aqueous ammonia solution. The $AlPO_4$ precipitate was separated from the aqueous phase by filtration, then dispersed in 4 liters of isopropanol for washing, again collected on a filter, and dried overnight in a vacuum oven at about 80° F.

The dried AlPO$_4$ had a BET/N$_2$ surface area (ASTM D 3037-78) of about 65 m$^2$/g, a CTAB surface area (ASTM D 3765-80, using cetyl-trimethylammonium bromide) of 52 m$^2$/g, and showed considerable amorphous regions by x-ray diffraction measurements.

EXAMPLE II

In this example the compounding, vulcanizing and properties of two filled rubber compositions are described. Rubber compositions were prepared according to Recipe I.

| Recipe I | Run 1 (Invention) | Run 2 (Control) |
|---|---|---|
| SBR 1500[1], parts by weight | 40 | 40 |
| AlPO$_4$, parts by weight | 16 | — |
| Silica[2], parts by weight | — | 16 |
| ZnO, parts by weight | 1.6 | 1.6 |
| Stearic Acid, parts by weight | 0.8 | 0.8 |
| Sulfur, parts by weight | 1.1 | 1.1 |
| Altax[3], parts by weight | 0.6 | 0.6 |
| DPB[4], parts by weight | 0.6 | 0.6 |

[1]emulsion polymerized butadiene-styrene rubber with a bound styrene content of about 23.5 weight-% and a nominal Mooney viscosity of 52 at 212° F.; marketed by General Tire and Rubber Company, Akron, Ohio;
[2]Hi-Sil EP; precipitated, amorphous, hydrated silica having a specific gravity of about 2.0, a surface area (BET/N$_2$) of about 60 m$^2$/g, and an ultimate particle size of about 0.04 microns; marketed by PPG Industries, Pittsburgh, Ohio;
[3]benzothiazyl disulfide, a primary accelerator marketed by R. T. Vanderbilt, Norwalk, Connecticut;
[4]diphenyl-guanidine, a secondary accelerator marketed by Monsanto, Industrial Chemicals Company, St. Louis, Missouri.

The ingredients of the rubber compositions were compounded on a roll mill having a 2" diameter according to the following procedure: mill rubber for 1 minute at 150° F., add filler (AlPO$_4$ or SiO$_2$) and mill for 10 minutes at 150° F., and finally add curing agents and mill for 5 minutes at about 150° F. The compound was milled with three tight passes for 3 minutes.

Milled rubber compounds were vulcanized in a compression mold at 168° C. for 30 minutes. Tensile and swelling data were determined on 6"×6" slabs having a thickness of 24 mils. Physical properties of vulcanized rubber compounds are summarized in Table I.

TABLE 1

|  | Run 1 (Invention) | Run 2 (Control) |
|---|---|---|
| Heat Buildup[5] (ΔT °C.) | 18.6 | 16.7 |
| Resilience[6] (%) | 80.4 | 82.3 |
| Minimum Mooney[7], 140° C. | 40 | 41 |
| Mooney scorch[7] (min. to 5 pt. rise) | 14.8 | 11.5 |
| Dispersion Rating[8] | 5 | 9 |
| 300% Modulus[9], (MPa) | 4.3 | 8.0 |
| Tensile Strength[9] (%) | 12.8 | 9.8 |
| Elongation[9] (%) | 595 | 355 |
| Shore A Hardness[10] | 59 | 62 |
| $v \times 10^{4[11]}$, moles/cc | 2.47 | 2.80 |

[5]determined according to ASTM D 623, Method A, by means of a Goodrich flexometer using a modified specimen size of 0.7" diameter and 1.0" height;
[6]determined according to ASTM D 945; same specimen size as for 5);
[7]determined according to ASTM D 1646; rotor diameter: 30.48 min; scorch time was determined for a 5 point rise above minimum Mooney at 140° C.;
[8]visual mill band rating test; 10 = best, 1 = poorest;
[9]determined according to ASTM D 412, Method A, employing a CRE-2K tensile machine, at 78° F.;
[10]determined according to ASTM D 2240 Shore durometer, Type A;
[11]determined according to the fast swell method described in Rubber World, Volume 135 (1956), pages 67 and 254, using 6" × 6" slabs of 24 mil thickness which are immersed in n-heptane for 2 hours at 60° C. and 3 hours at 30° C.; the higher $v$ the greater the amount of rubber-rubber and rubber-filler cross-linking.

Data in Table I show the following advantages of AlPO$_4$ (surface area: 65 m$^2$/g) over SiO$_2$ (surface area: 60 m$^2$/g) as filler in cured rubber compounds: longer time to scorch (permitting more time for extrusion of industrial rubber goods such as hoses), higher tensile strength and elongation. AlPO$_4$ had the following disadvantages as filler in rubber versus SiO$_2$: slightly higher heat buildup (hysteresis) and slightly lower resilience, slightly lower hardness and poorer dispersion in the rubber. The lower modulus of the rubber composition of this invention containing AlPO$_4$ can be an advantage or disadvantage, depending on the specific end use.

We claim:
1. A vulcanizable rubber composition comprising:
   (a) a vulcanizable natural rubber or vulcanizable synthetic rubber
   (b) a reinforcing amount of aluminum phosphate and,
   (c) additive effective for vulcanizing.
2. A composition of claim 1 wherein said aluminum phosphate is AlPO$_4$ having a BET/N$_2$ surface area (ASTM D 3037-78) ranging from about 40 to about 100 m$^2$/g and a CTAB surface area (ASTM D 3765-80) ranging from about 30 to about 80 m$^2$/g.
3. A composition of claim 2 wherein said AlPO$_4$ is present in an amount in a range of about 2-60 phr.
4. A composition of claim 1 wherein said rubber is a butadiene-styrene rubbery copolymer.
5. A composition of claim 2 wherein said rubber is a butadiene-styrene rubbery copolymer.
6. A composition of claim 3 wherein said rubber is a butadiene-styrene rubbery copolymer.
7. A product obtained by curing the composition of claim 1.
8. A product obtained by curing the composition of claim 2.
9. A product obtained by curing the composition of claim 3.
10. A product obtained by curing the composition of claim 4.
11. A product obtained by curing the composition of claim 5.
12. A product obtained by curing the composition of claim 6.
13. A composition of claim 1 comprising at least one additive chosen from among the group consisting of sulfur, cure accelerators, processing aids, light stabilizers and ozone stabilizers.
14. A composition of claim 2 comprising at least one additive chosen from among the group consisting of sulfur, cure accelerators, processing aids, light stabilizers and ozone stabilizers.
15. A composition of claim 3 comprising at least one additive chosen from among the group consisting of sulfur, cure accelerators, processing aids, light stabilizers and ozone stabilizers.
16. A composition of claim 4 comprising at least one additive chosen from among the group consisting of sulfur, cure accelerators, processing aids, light stabilizers and ozone stabilizers.
17. A composition of claim 5 comprising at least one additive chosen from among the group consisting of sulfur, cure accelerators, processing aids, light stabilizers and ozone stabilizers.
18. A composition of claim 6 comprising at least one additive chosen from among the group consisting of sulfur, cure accelerators, processing aids, light stabilizers and ozone stabilizers.
19. A process for providing vulcanized rubber compounds comprising (1) admixing a natural rubber or vulcanizable synthetic rubber with a reinforcing amount of aluminum phosphate and additive effective for vulcanizing and (2) vulcanizing the admixture.

20. A process of claim 19 wherein the amount of aluminum phosphate is in the range of about 2-60 phr.

21. A process of claim 19 wherein rubber is butadiene/styrene rubbery copolymer.

22. A process of claim 20 wherein rubber is butadiene/styrene rubbery copolymer.

* * * * *